United States Patent
Treat et al.

(10) Patent No.: US 9,542,245 B2
(45) Date of Patent: Jan. 10, 2017

(54) PROCESSING USER INPUT EVENTS IN A WEB BROWSER

(71) Applicant: BlackBerry Limited, Waterloo (CA)

(72) Inventors: Adam Chester Treat, Boston, MA (US); Eli Joshua Fidler, Toronto (CA); Karl Arvid Nilsson, Toronto (CA); David Francis Tapuska, Waterloo (CA); Genevieve Elizabeth Mak, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/922,566

(22) Filed: Oct. 26, 2015

(65) Prior Publication Data
US 2016/0055040 A1   Feb. 25, 2016

Related U.S. Application Data

(63) Continuation of application No. 14/075,482, filed on Nov. 8, 2013, now Pat. No. 9,170,861, which is a (Continued)

(51) Int. Cl.
*G06F 9/54*   (2006.01)

(52) U.S. Cl.
CPC ......... *G06F 9/542* (2013.01); *G06F 2209/545* (2013.01)

(58) Field of Classification Search
CPC ............................ G06F 9/542; G06F 2209/544
See application file for complete search history.

(56) References Cited

U.S. PATENT DOCUMENTS 6,546,397 B1   4/2003   Rempell
6,560,626 B1   5/2003   Hogle et al.
(Continued)

FOREIGN PATENT DOCUMENTS

EP   363222 A2   4/1990
EP   1450244 A2   8/2004
(Continued)

OTHER PUBLICATIONS

Reis et al., "Using Processes to Improve the Reliability of Browser-based Applications", 2009, pp. 1-13, [http://citeseerx.ist.psu.edu/viewdoc/download?doi=10.1.1.136.2646&rep1&type=pdf].
(Continued)

*Primary Examiner* — Charles E Anya
(74) *Attorney, Agent, or Firm* — Rowand LLP

(57) ABSTRACT

A method and computing device are provided for processing user events received via a user interface, such as a touchscreen, in multiple threads. When a user event is received for a target element in a webpage, the user event is dispatched to both a main browser thread and a secondary thread. The secondary thread processes user events in accordance with established default actions defined within the browser, while the main thread processes the user events in accordance with any event handlers defined for that target element. The main thread processing may be delayed by other interleaved task, and the secondary thread may be given priority over the main thread. When the secondary thread completes processing, an updated webpage is displayed. When the main thread subsequently completes processing, its updated rendering of the webpage is displayed. The secondary thread thus provides an early user interface response to the user event.

16 Claims, 8 Drawing Sheets

Related U.S. Application Data continuation of application No. 12/985,338, filed on Jan. 5, 2011, now Pat. No. 8,589,950.

(56) References Cited

U.S. PATENT DOCUMENTS

| | | | |
|---|---|---|---|
| 6,578,073 B1 | 6/2003 | Starnes et al. | |
| 6,598,068 B1* | 7/2003 | Clark | G06F 9/52 |
| | | | 718/104 |
| 6,670,969 B1 | 12/2003 | Halstead, Jr. et al. | |
| 6,728,960 B1 | 4/2004 | Loomans | |
| 7,155,727 B2 | 12/2006 | Elving | |
| 7,237,193 B1 | 6/2007 | Zaky et al. | |
| 7,330,894 B2 | 2/2008 | Vallone | |
| 7,496,916 B2 | 2/2009 | Dettinger et al. | |
| 8,145,995 B2 | 3/2012 | Rohrabaugh et al. | |
| 2004/0027375 A1 | 2/2004 | Ellis et al. | |
| 2004/0122971 A1 | 6/2004 | Joshi et al. | |
| 2004/0148307 A1 | 7/2004 | Rempell | |
| 2004/0225965 A1 | 11/2004 | Garside et al. | |
| 2004/0254913 A1 | 12/2004 | Bernstein et al. | |
| 2005/0091611 A1* | 4/2005 | Colleran | G06F 11/1415 |
| | | | 715/804 |
| 2005/0138633 A1 | 6/2005 | Barsade et al. | |
| 2006/0259585 A1 | 11/2006 | Keohane et al. | |
| 2006/0265662 A1 | 11/2006 | Gertzen | |
| 2007/0124416 A1 | 5/2007 | Casey et al. | |
| 2008/0148266 A1 | 6/2008 | Caselli et al. | |
| 2009/0100164 A1 | 4/2009 | Skvortsov et al. | |
| 2009/0225039 A1 | 9/2009 | Williamson et al. | |
| 2009/0254807 A1 | 10/2009 | Singh et al. | |
| 2009/0287824 A1 | 11/2009 | Fisher et al. | |
| 2010/0023884 A1* | 1/2010 | Brichford | G06F 3/14 |
| | | | 715/760 |
| 2010/0053110 A1 | 3/2010 | Carpenter et al. | |
| 2010/0162126 A1 | 6/2010 | Donaldson et al. | |
| 2011/0181526 A1 | 7/2011 | Shaffer et al. | |
| 2011/0314315 A1* | 12/2011 | Wong | G06F 1/3228 |
| | | | 713/323 |
| 2012/0084734 A1 | 4/2012 | Wilairat | |
| 2012/0284663 A1 | 11/2012 | Driver | |

FOREIGN PATENT DOCUMENTS

| | | |
|---|---|---|
| WO | 2007094816 A2 | 8/2007 |
| WO | 2008036852 A1 | 3/2008 |

OTHER PUBLICATIONS

European Patent Office, "Extended European Search Report", issued in connection with international patent application No. 12150313.0, Jun. 14, 2012, (5 pages).

* cited by examiner

PROCESSING USER INPUT EVENTS IN A WEB BROWSER

REFERENCE TO PRIOR APPLICATIONS

This application is a continuation of U.S. application Ser. No. 14/075,482 filed Nov. 8, 2013 U.S. Pat. No. 9,170,861 which is a continuation of U.S. application Ser. No. 12/985,338, filed Jan. 5, 2011 U.S. Pat. No. 8,589,950. The entirety of these applications are incorporated herein by reference.

BACKGROUND

1. Technical Field

The present application relates generally to the processing of detected user input events in a web browser.

2. Description of the Related Art

User agents and other applications used to render documents for presentation to a user, such as a web browser, process user events received via one or more user input mechanisms. User input mechanisms can include pointing and similar devices such as mice, touchpads, trackpads, and optical joysticks, as well as touchscreen interfaces. The outcome of the processed user event can include scrolling, zooming in or zooming out of the displayed document. The user events are processed in a browser's main thread; however, the user interface of the browser may appear unresponsive to the user when the processing of user events is interleaved with other, potentially long-running tasks.

BRIEF DESCRIPTION OF THE DRAWINGS

In drawings which illustrate by way of example only embodiments of the present application.

DETAILED DESCRIPTION

Figure 1:
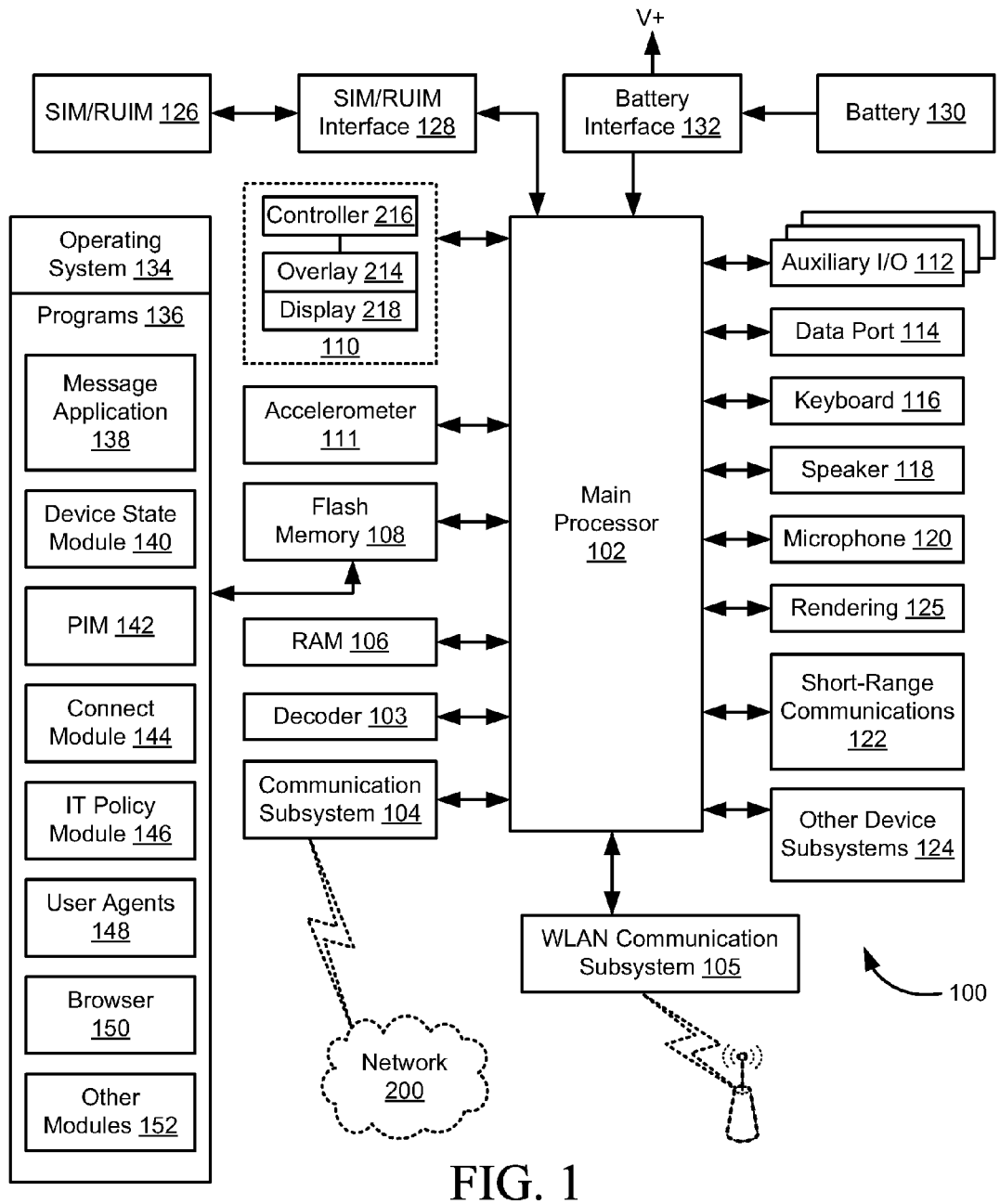
FIG. 1 is a block diagram of an embodiment of a computing device.

The embodiments described herein provide a system, method and apparatus for improved handling of user events by a browser or similar application to increase the apparent responsiveness of the browser's user interface to the user when responding to user input events such as cursor or touch events. A method and computing device are provided for processing user events received via a user interface, such as a touchscreen, in multiple threads. When a user event is received for a target element in a webpage, the user event is dispatched to both a main browser thread and a secondary thread. The secondary thread processes user events in accordance with established default actions defined within the browser, while the main thread processes the user events in accordance with any event handlers defined for that target element. The main thread processing may be delayed by other interleaved task, and the secondary thread may be given priority over the main thread. When the secondary thread completes processing, an updated webpage is displayed. When the main thread subsequently completes processing, its updated rendering of the webpage is displayed. The secondary thread thus provides an early user interface response to the user event. The default handling action comprises either one of a scrolling action and a zoom action.

There is thus provided a method, comprising: in response to a user event received for a target element in a webpage, concurrently dispatching the user event for processing in a main thread and a secondary thread; processing the user event in the main thread using an event handler associated with said target element; processing the user event in the secondary thread using a default handling action defined for the webpage; and rendering the webpage for display by a first one of the main thread and the secondary thread upon said first one of the main thread and the secondary thread completing said processing of the user event.

In one aspect, said processing of the user event in the main thread and said processing of the user event in the secondary thread are carried out at least partially concurrently.

In another aspect, the method further comprises, while said processing of the user event in the main thread and said processing of the user event in the secondary thread are executing concurrently, the main thread determining that the default handling action is to be prevented for said user event; and the main thread notifying the secondary thread to terminate, such that said rendering is executed by the main thread.

In a further aspect, said rendering is executed by the main thread, the method further comprising the main thread notifying the secondary thread to terminate said secondary thread's processing of the user event.

In still another aspect, said rendering is executed by the secondary thread, and the method further comprises: displaying said rendered webpage; upon completion of said processing of the user event by the main thread, the main thread rendering said webpage for display; and displaying said webpage as rendered by the main thread.

In still a further aspect, said processing of the user event by the secondary thread commences before said processing of the user event by the main thread.

The embodiments herein also provide that said processing of the user event by the secondary thread is delayed by a predetermined period, and further provide for displaying said rendered webpage. The user event may be a mouse event or a touch event. The event handler associated with said target element may be assigned to said target element, or it may be assigned to an ancestor of said target element.

Further, processing the user event in the main thread may comprise processing said user event using a JavaScript script provided for said webpage.

These embodiments will be described and illustrated primarily in relation to computing devices such as communication devices that are adapted to communicate wirelessly various types of networks. It will be appreciated by those skilled in the art, however, that this description is not intended to limit the scope of the described embodiments to implementation on these particular systems or to wireless-enabled devices. For example, the embodiments described herein may be applied to any appropriate communication device or data processing device, whether or not it is adapted to communicate with another communication or data processing device over a fixed or wireless connection, whether portable or wirelessly enabled or not, whether provided with voice communication capabilities or not. The computing device can be adapted to process data and carry out operations on data in response to user commands for any number of purposes, including productivity and entertainment. Thus, the embodiments described herein may be implemented on computing devices adapted for content browsing, communication or messaging, including without limitation cellular phones, smartphones, wireless organizers, personal digital assistants, desktop computers, terminals, laptops, tablets, handheld wireless communication devices, notebook computers, ebook readers, entertainment devices such as MP3 or video players, and the like. Unless expressly stated, a computing or communication device may include any such device.

FIG. 1 is a block diagram of an exemplary embodiment of a computing device 100. The computing device 100 includes a number of components such as a main processor 102 that controls the overall operation of the computing device 100. Communication functions, including data and voice communications, are performed through a communication subsystem 104. Data received by the computing device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the computing device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the computing device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems.

The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. As noted above, voice communication capabilities and connectivity to voice-centric networks is not mandatory for the operation of the computing device 100 with the within embodiments. Thus, the wireless communication subsystem 104 may be omitted. If so, optionally a dongle or other peripheral device (not shown) may be connected to the device 100 to provide the device 100 with access to the wireless network 200.

The main processor 102 also interacts with additional subsystems such as a Random Access Memory (RAM) 106, a flash memory 108, a display 110, other data and memory access interfaces such as an auxiliary input/output (I/O) subsystem 112 or a data port 114, a keyboard 116, a speaker 118, a microphone 120, the short-range communications 122 and other device subsystems 124. The communication device may also be provided with an accelerometer 111, which may be used to detect gravity- or motion-induced forces and their direction. Detection of such forces applied to the device 100 may be processed to determine a response of the device 100, such as an orientation of a graphical user interface displayed on the display assembly 110 in response to a determination of the current orientation of the device 100.

In some embodiments, the user device 100 may comprise a touchscreen-based device, in which the display interface 110 is a touchscreen interface that provides both a display for communicating information and presenting graphical user interfaces, as well as an input subsystem for detecting user input that may be converted to instructions for execution by the device 100. The touchscreen display interface 110 may be the principal user interface provided on the device 100, although in some embodiments, additional buttons, variously shown in the figures or a trackpad, or other input means may be provided. In one embodiment, a transmissive TFT LCD screen 218 is overlaid with a clear touch sensor assembly 214 that supports single and multi-touch actions such as tap, double-tap, tap and hold, tap and drag, scroll, press, flick, and pinch. The touchscreen display interface 110 detects these single and multi-touch actions, for example through the generation of a signal or signals in response to a touch, which may then be processed by the processor 102 or by an additional processor or processors in the device 100 to determine the location of the touch action, whether defined by horizontal and vertical screen position data or other position data. Touch location data may include an area of contact or a single point of contact, such as a point at or near a center of the area of contact. The touchscreen display interface 110 may be provided with separate horizontal and vertical sensors or detectors to assist in identifying the location of a touch. A signal is provided to the controller 216, shown in FIG. 1, in response to detection of a touch. The controller 216 and/or the processor 102 may detect a touch by any suitable contact member on the touch-sensitive display 110.

Some of the subsystems of the computing device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The computing device 100 can send and receive communication signals over the wireless network 200 after required network registration or activation procedures have been completed. Network access is associated with a subscriber or user of the computing device 100. To identify a subscriber, the computing device 100 requires a SIM/RUIM/UICC card 126 (i.e. Subscriber Identity Module, Removable User Identity Module, Universal Integrated Circuit Card, or the like) or another suitable identity module to be inserted into a SIM/RUIM/UICC interface 128 in order to communicate with a network. The SIM/RUIM/UICC card 126 is one type of a conventional "smart card" that can be used to identify a subscriber of the computing device 100 and to personalize the computing device 100, among other things. Without the SIM/RUIM/UICC card 126, the computing device 100 is not fully operational for communication with the wireless network 200. By inserting the SIM/RUIM/UICC card 126 into the SIM/RUIM/UICC interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM/UICC card 126 includes a processor and memory for storing information. Once the SIM/RUIM/UICC card 126 is inserted into the SIM/RUIM/UICC interface 128, it is coupled to the main processor 102. In order to identify the subscriber, the SIM/RUIM/UICC card 126 can include some user parameters such as an International Mobile Subscriber Identity (IMSI). An advantage of using the SIM/RUIM/UICC card 126 is that a subscriber is not necessarily bound by any single physical mobile device. The SIM/RUIM/UICC card 126 can store additional subscriber information for a mobile device as well, including datebook (or calendar) information and recent call information. Alternatively, user identification information can also be programmed into the flash memory 108.

The computing device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the computing device 100. Although current technology makes use of a battery, future technologies such as micro fuel cells can provide the power to the computing device 100.

The computing device 100 also includes an operating system 134 and software components 136 to 152 which are described in more detail below. The operating system 134 and the software components 136 to 152 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 138 to 152, such as specific device applications, or parts thereof, can be temporarily loaded into a volatile store such as the RAM 106. Select other modules 152 may also be included, such as those described herein. Other software components can also be included, as is well known to those skilled in the art.

The subset of software applications 136 that control basic device operations, including data and voice communication applications, will normally be installed on the computing device 100 during its manufacture. Other software applications include a message application 138 that can be any suitable software program that allows a user of the computing device 100 to send and receive electronic messages. Various alternatives exist for the message application 138 as is well known to those skilled in the art. Messages that have been sent or received by the user are typically stored in the flash memory 108 of the computing device 100 or some other suitable storage element in the computing device 100. In at least some embodiments, some of the sent and received messages can be stored remotely from the device 100 such as in a data store of an associated host system with which the computing device 100 communicates.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the computing device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the computing device 100 with respect to such items. This can be particularly advantageous when the host computer system is the mobile device subscriber's office computer system. Some or all of the data items stored at the computing device 100 may be indexed for searching on the device 100 either through a corresponding application, such as the PIM 142, or another suitable module. In addition, the items may be searchable using a unified search process implemented in the device operating system 134. For example, application data items can be encapsulated in a searchable entity class and registered with a unified search engine on the device 100 that executes searches against all registered data repositories on the device based on received queries. The search engine can also be configured to invoke a search process of external resources, such as Internet search engines or remote databases.

The computing device 100 also includes a connect module 144, and an information technology (IT) policy module 146. The connect module 144 implements the communication protocols that are required for the computing device 100 to communicate with the wireless infrastructure and any host system, such as an enterprise system, with which the computing device 100 is authorized to interface.

The connect module 144 includes a set of Application Programming Interfaces (APIs) that can be integrated with the computing device 100 to allow the computing device 100 to use any number of services associated with the enterprise system or with other systems accessible over the network 200. The connect module 144 allows the computing device 100 to establish an end-to-end secure, authenticated communication pipe with the host system. A subset of applications for which access is provided by the connect module 144 can be used to pass IT policy commands from the host system to the computing device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the computing device 100, such as browsers 150, other user agents 148, and other modules 152. These software applications can be third party applications, which are added after the manufacture of the computing device 100. Other examples of third party applications include games, calculators, utilities, etc.

The additional applications can be loaded onto the computing device 100 through at least one of the wireless network 200, the auxiliary I/O subsystem 112, the data port 114, the short-range communications subsystem 122, or any other suitable device subsystem 124. This flexibility in application installation increases the functionality of the computing device 100 and can provide enhanced on-device functions, communication-related functions, or both. For example, secure communication applications can enable electronic commerce functions and other such financial transactions to be performed using the computing device 100.

The data port 114 enables a subscriber to set preferences through an external device or software application and extends the capabilities of the computing device 100 by providing for information or software downloads to the computing device 100 other than through a wireless communication network. The alternate download path can, for example, be used to load an encryption key onto the computing device 100 through a direct and thus reliable and trusted connection to provide secure device communication.

The data port 114 can be any suitable port that enables data communication between the computing device 100 and another computing device. The data port 114 can be a serial or a parallel port. In some instances, the data port 114 can be a USB port that includes data lines for data transfer and a supply line that can provide a charging current to charge the battery 130 of the computing device 100.

The short-range communications subsystem 122 provides for communication between the computing device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the computing device 100 is substantially similar, except that the received signals are output to the speaker 118, and signals for transmission are generated by the microphone 120. Alternative voice or audio I/O subsystems, such as a voice message recording subsystem, can also be implemented on the computing device 100. Although voice or audio signal output is accomplished primarily through the speaker 118, the display 110 can also be used to provide additional information such as the identity of a calling party, duration of a voice call, or other voice call related information.

The communication subsystem component 104 may include a receiver, transmitter, and associated components such as one or more embedded or internal antenna elements, Local Oscillators (LOs), and a processing module such as a Digital Signal Processor (DSP) in communication with the transmitter and receiver. Signals received by an antenna through the wireless network 200 are input to the receiver, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP. In a similar manner, signals to be transmitted are processed, including modulation and encoding, by the DSP, then input to the transmitter for digital-to-analog (D/A) conversion, frequency up conversion, filtering, amplification and transmission over the wireless network 200 via an antenna. The DSP not only processes communication signals, but also provides for receiver and transmitter control, including control of gains applied to communication signals in the receiver and the transmitter. When the computing device 100 is fully operational, the transmitter is typically keyed or turned on only when it is transmitting to the wireless network 200 and is otherwise turned off to conserve resources. Similarly, the receiver is periodically turned off to conserve power until it is needed to receive signals or information (if at all) during designated time periods. Other communication subsystems, such as the WLAN communication subsystem 105 or a WPAN communication subsystem, not shown, may be provided with similar components as those described above configured for communication over the appropriate frequencies and using the appropriate protocols. The particular design of the communication subsystem 104, 105, or other communication subsystem is dependent upon the communication network 200 with which the computing device 100 is intended to operate. Thus, it should be understood that the foregoing description serves only as one example.

Figure 2:
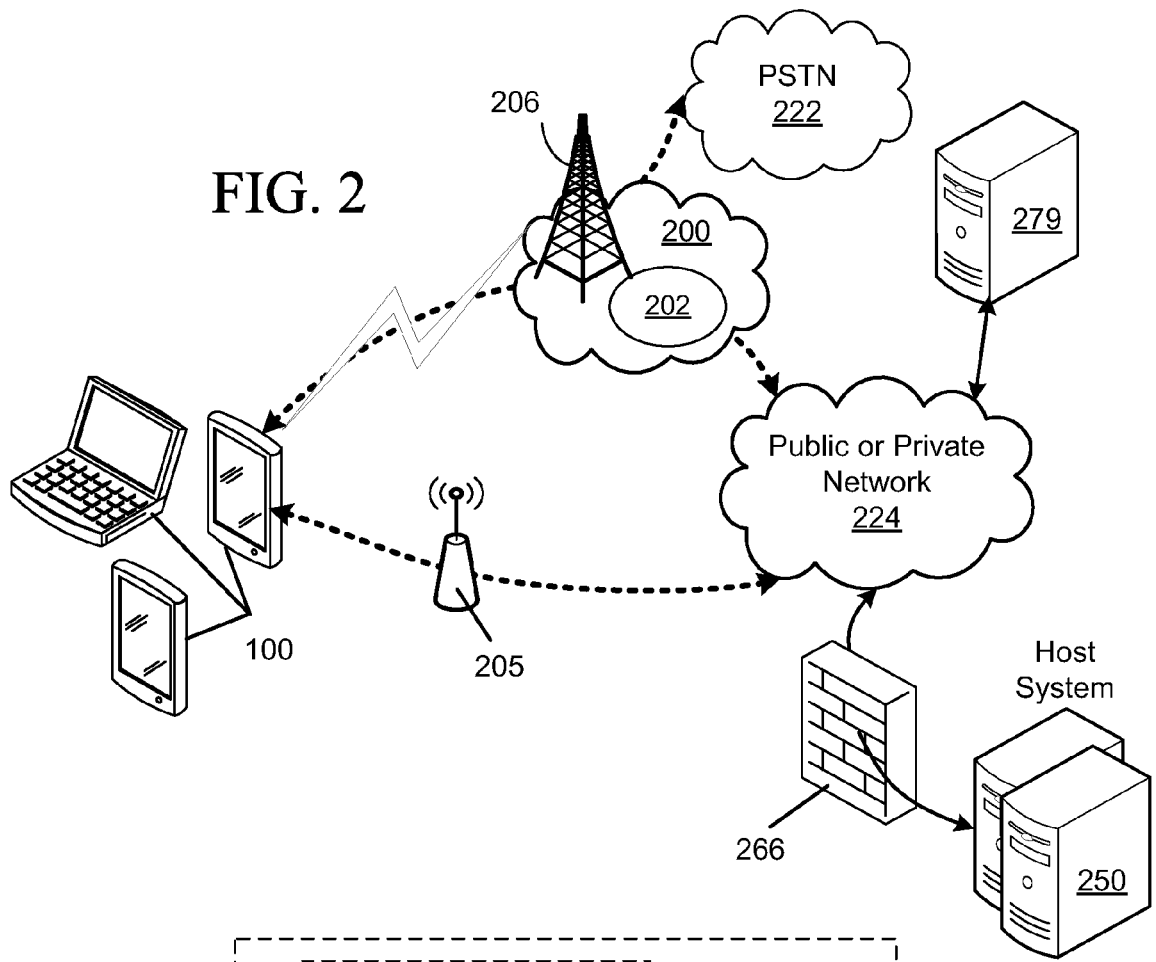
FIG. 2 is a schematic diagram of an exemplary network topology for use with the computing device of FIG. 1.

FIG. 2 illustrates a possible network topology for the computing device 100, including paths for data and voice traffic, and including a host or enterprise system 250. The host or enterprise system 250 will typically be a corporate enterprise or other local area network (LAN), but can also be a home office computer or some other private or quasi-private system, for example a subscription-based Internet service. Typically, a number of communication devices 100 can communicate wirelessly with the host or enterprise system 250 through one or more nodes 202 of the wireless network 200.

The host or enterprise system 250 comprises a number of network components, not shown, connected to each other by a network. Within the system 250, for example, user (including administrator) computers may be situated on a LAN connection, and one or more of these desktop computers can be provided with connection facilities for loading information (e.g. PIM data, private symmetric encryption keys to facilitate secure communications) from the user computer to the computing device 100, and can be particularly useful for bulk information updates often performed in initializing the computing device 100 for use. To facilitate the operation of the computing device 100 and the wireless communication of messages and message-related data between the computing device 100 and components of the host system 250, a number of wireless communication support components are provided within the system 250 (not shown). In some implementations, the wireless communication support components can include one or more data stores, a message management server, a mobile data server, a web server, such as Hypertext Transfer Protocol (HTTP) server, a contact server, and a device manager module including an information technology policy server and editor. HTTP servers can also be located outside the host or enterprise system, as indicated by the HTTP server 279 attached to the network 224. The mobile data server can also connect to the Internet or other public network through an enterprise HTTP server or other suitable web server such as a File Transfer Protocol (FTP) server, to retrieve webpages and other data. Requests for webpages are typically routed through mobile data server and then to the enterprise HTTP server, through suitable firewalls and other protective mechanisms. The web server then retrieves the webpage over the Internet, and returns it to mobile data server. The mobile data server is typically provided, or associated, with an encoder that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the computing device 100 via the shared network infrastructure 224 and the wireless network 200. Those skilled in the art know how to implement these various components. Other components can also be included as is well known to those skilled in the art.

The computing device 100's access to IP networks and to a public switched telephone network (PSTN), if applicable, can be provided through the wireless network 200, which comprises one or more nodes 202 configured for communication in accordance with a suitable mobile telephony standard. In turn, the wireless network 200 provides the computing device 100 with connectivity to the Internet or other public wide area network 224, and thence to the host or enterprise system 250. At the same time, if the computing device 100 is a multiple-mode device, it may also communicate with the host or enterprise system 250 over an enterprise LAN or WLAN, represented by the access point 205. It will be appreciated by those skilled in the art, however, that access to the host system 250 need not be limited to access via the enterprise network (whether wireless or not). Instead, the computing device 100 may access the host or enterprise system 250 over another network, such as the wide area IP network 224, via different access means, such as an access point located at the communication device user's home, or at a public or private Wi-Fi hotspot.

In this exemplary embodiment, the computing device 100 communicates with the host or enterprise system 250 through node 202 of the wireless network 200 and a shared network infrastructure 224 such as a service provider network or the public Internet. Access to the host or enterprise system can be provided through one or more routers (not shown), and computing devices of the host or enterprise system 250 can operate from behind a firewall or proxy server 266. A proxy server provides a secure node and a wireless internet gateway for the host or enterprise system 250. The proxy server intelligently routes data to the correct destination server within the host or enterprise system 250.

For some wireless networks 200 or LANs 205, the computing device 100 may be registered or activated with the respective network. A process for identifying a subscriber to a cellular network using a SIM or other identifier card 126 is described above. Other methods of registering or identifying the computing device 100 to various networks will be known to those of ordinary skill in the art. However, registration or activation may not be required for all wireless networks 200, LANs or WLANs, as some networks may allow access without prior registration or activation. The computing device 100 may also be provisioned or configured to access one or more networks. Methods of provisioning services on a computing device 100 will be generally known to those skilled in the art, but as a non-limiting example, a request for registration may be sent from the computing device 100 to a registration server of a service (not shown). If the request is approved, the registration server may transmit to the computing device 100 a service book or similar data item containing data and instructions to enable the computing device 100 to provision the service. The service book, when received at the computing device 100, may be self-executing, and permits the user to enter account information relevant to the associated service. This information is then transmitted from the computing device 100 to a provisioning server of the service provider (not shown), which then creates a service account associated with the computing device 100. Provisioning may also be carried out in compliance with the OMA DM (Open Mobile Alliance Device Management) specification version 1.2 or its predecessor or successor versions, published by the Open Mobile Alliance Ltd.

The embodiments herein will be described and illustrated primarily in relation to resources such as webpages, web applications, other rich media applications, and widgets; and to user agents such as browser applications (browsers), such as the browser 150 identified in FIG. 1. In particular, the resources and user agents described herein may conform to known standards for the structure and presentation of content, in particular HTML5, published by the World Wide Web Consortium (W3C) at w3.org. In addition, the within embodiments may comply with companion and predecessor standards and specifications, including without limitation HTML 4.01, XHTML 1.0 and 2.0, DOM Levels 1 through 3, and CSS Levels 1 through 3, also published by the World Wide Web Consortium (W3C) at w3.org. In particular, the resources contemplated herein may comprise or be associated with elements such as scripts written in JavaScript™ published by the Mozilla Foundation, Mountain View, Calif., www.mozilla.org (trademark owned by Oracle Corporation, Redwood Shores, Calif.) or in other scripting languages designed to enable programmatic access to computational objects within a host environment; Adobe Flash and Flex technologies from Adobe Systems Incorporated, San Jose, Calif.; video files in any one of various compatible formats, including Flash, Quicktime, MPEG and in particular MPEG-4; dynamic HTML technology, widgets, modules, code snippets, and the like, which may be delivered together with the resource to the computing device 100, or which alternatively may be downloadable separately by the client application, progressively downloaded, or streamed from the server for use with the resource.

Figure 3:
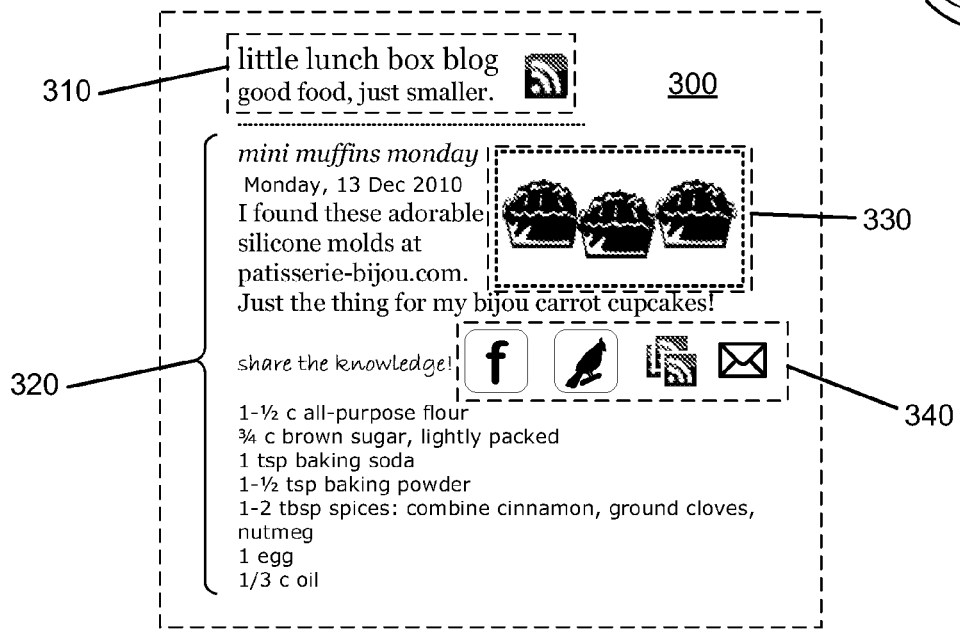
FIG. 3 is a schematic diagram of HTML content that is renderable for display using the device of FIG. 1.

FIG. 3 is a schematic illustration of an HTML document 300, such as a webpage, comprising a number of elements. The webpage comprises a number of containers (i.e., <div> regions, as defined in accordance with HTML4+ standards) 310, 320, 330 and 340. Each of these containers comprises one or more elements. Container 310 comprises text and graphics, while container 320 comprises text elements. Containers 330 and 340 comprise image elements. The general construction and composition of such webpages and documents will be known to those skilled in the art. In particular, in this example, the images comprised in the last container 340 represent various social networking and communication services, and actuation of one of these images (for example, by inputting a user event such as a tap or click while that image is in focus fires an event handler (e.g., onmousedown) which invokes a script for generating a further user interface screen with input fields (not shown in FIG. 3). The script may be JavaScript code, other scripts, or comprise code invoking APIs calling functions defined within the operating system of the device 100 or the browser 150, and may be embedded within the HTML document 300 itself, or else referenced in the header of the HTML document 300 and accessed separately by the browser 150. The specific implementation of such scripts and the like will be understood by those skilled in the art.

Figure 4:
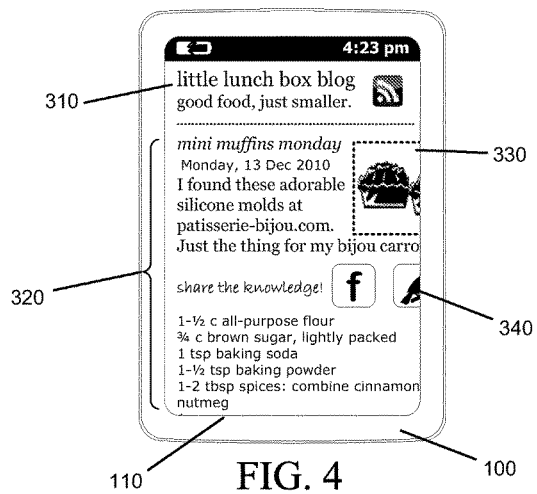
FIG. 4 is an illustration of a screen presenting the HTML content of FIG. 3 displayed on the computing device of FIG. 1.

When displayed on a computing device 100, not all of the content of the HTML document 300 may be visible. FIG. 4 illustrates a possible appearance of the document 300 when it is displayed on a tablet computing device or a smartphone comprising a touchscreen display 110. As can be seen in FIG. 4, only portions of the images contained in the containers 330, 340 are visible, and portions of the text elements of the container 320 are not visible. As is commonly known in the art, the remaining portions of the document 300 may be rendered visible in the display 110 in response to user events representing features such as scrolling (which causes the view of the document 300 to pan in a given direction), or by zooming out (which reduces the size of the view displayed on the display 110).

The resources and user agents may be implemented using one or more of the foregoing technologies and other combinations of technologies. Further, the resources may be executed in browser, microbrowser and browser widget environments implemented using various known layout engines including, without limitation, WebKit (available at webkit.org), Gecko (Mozilla Foundation), Trident (Microsoft Corporation, Redmond, Wash.), Presto (Opera Software ASA, Oslo, Norway) and the like designed for various runtime environments including Java™ (Oracle Corporation, Redwood Shores Calif.), iOS™ (Apple Inc., Cupertino Calif.), and Windows™ (Microsoft Corporation) and BlackBerry and PlayBook OS (Research In Motion Limited, Waterloo, Canada). Accordingly, the user agent or environment may be provided with one or more plug-in modules adapted for processing and rendering ancillary items, such as plug-ins for rendering Flash content.

The relevant environment need not be restricted to a browser environment; for example, other runtime environments designed for implementation of rich media and Internet applications may be used, such as Adobe Integrated Runtime (AIR), also from Adobe Systems Incorporated. The selection and implementation of suitable existing and future structural or presentation standards, various elements, scripting or programming languages and their extensions, browser and runtime environments and the like, will be known to those of skill in the art.

Further, the aforementioned browser 150 may be used to render a number of different types of files for presentation to the user. For example, other user agents may make use of the browser 150 engine to render HTML documents such as HTML-formatted email, help files, and other structured documents.

The computing device 100 may receive user input by means of one or more user input systems, such as a user input device or interface, including without limitation the keyboard 116, display 110 where the display is comprised in a touchscreen interface (referred to herein as a touchscreen display 110), microphone 120, trackball, buttons, trackpad, scroll wheel, optical joystick, rocker switch, and the like. Advantageously, the computing device 100 is provided with a touchscreen display 110. Several of these user input devices may be external to the computing device 100 itself; for example, a pointing device such as a mouse, trackball, tablet or touchpad may be provided as a peripheral component. In the case of a mobile device such as a smartphone or tablet computer, user input mechanisms are advantageously incorporated into the chassis of the computing device 100 itself for improved portability and mobility. For example, in a touchscreen computing device 100 such as a tablet or smartphone, the device 100 is provided not only with a touchscreen display 110, which may provide the main user input mechanism and permit alphanumeric data entry through display of an interactive virtual keyboard on the display 110, but also with one or more buttons, and/or an optical joystick or trackpad. These various user input devices and interfaces may be actuated by the user (for example, through the application of touch, pressure, and or directional movement) to control the operation of the computing device, for example to navigate through graphical user interfaces, menu structures, and the like, to select and initiate application or operating system commands for execution, to input data for processing or transmission by the computing device, or to change settings on the computing device.

While the majority of these user input mechanisms receive user input through user Contact—primarily, manual manipulation—notionally these mechanisms may be considered as input mechanisms for detecting inputs either for cursor-based control or for touch-based control of the computing device 100. Cursor-based control, typically associated with pointing devices such as mice, permits the user to control the positioning of a cursor or other sprite displayed in a graphical user interface rendered on the display 110. When the cursor is positioned ("hovering") over a particular graphical user interface element, the input mechanism may be actuated (for example, by pressing a mouse button) to invoke a command associated with that element. Optical joysticks and trackpads may be used for cursor-based control. Touch-based control, typically associated with touchscreen displays 110, permits the user to more directly engage the graphical user interface elements displayed on the display 110 by touching or tapping the surface of the display 110 corresponding to that element. The touchscreen display 110 and its associated controller and processor 102 can be configured to also detect and identify gestures and multi-touch input (directional input and multiple concurrent touch input, respectively).

In a browser or other runtime environment such as those described above, user input detected (a user event) at one or more of the user input mechanisms provided on the device 100 may be passed to the processor 102 for determination of the type of detected input. In the case of directional input received from a pointing device or another cursor-based control mechanism such as a trackpad or optical joystick, the processor 102 receives raw data concerning the user event, such as an indication of the application of external force or contact, magnitude, directional, location, timing, and/or speed information, and determines from the raw data what type of user event occurred, such as a cursor event, mouse event or a touch event, which can include both gestures (comprising a series of touch events) and multitouch input (comprising a series of touch events, some of which may be concurrent) as well as single-touch inputs. In the case of a touch event, the touchscreen display controller 216 may process the raw data representative of the user input. The result of the processing of the processor 102 and/or controller 216 is passed to the current application, i.e. the application corresponding to the active screen currently displayed at the device 100.

The taxonomy and models used to define user events will be known to those skilled in the art. For example, mouse event types of mousedown, mousemove, mouseout, mouseover, mouseup, and mousewheel and their interaction with webpages are defined in HTML5 or its predecessor specifications and correspond to the detected inputs of mouse button click, movement, mouse button release, and mouse scrollwheel movement. A possible interaction of webpages with lower-level touch events, which may include touchstart, touchmove, touchend, touchcancel, and their combination to define higher-level gesture events such as gesturestart, gesturechange, and gestureend, is defined in "Safari DOM Additions Reference: User Experience", published by Apple Inc., Cupertino, Calif. These models and types may be implemented by the browser 150.

Figures 5A, 5B:
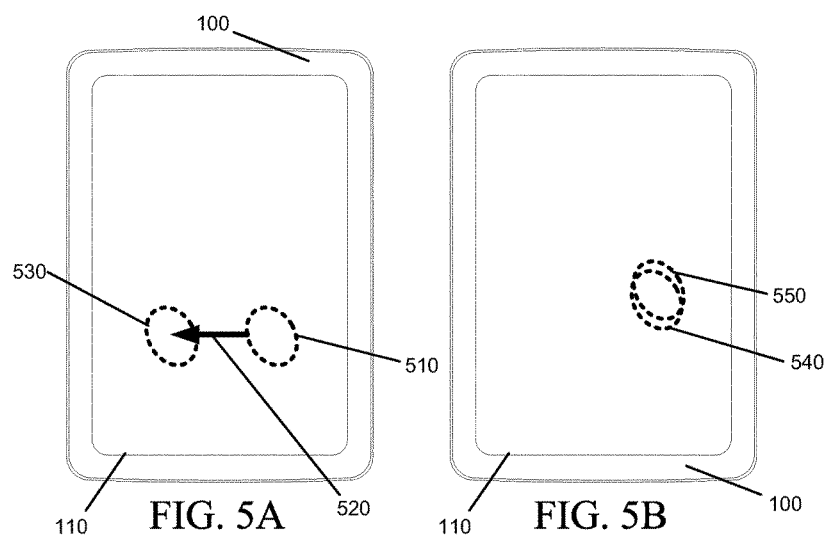
FIGS. 5A and 5B are schematic diagrams of possible touch events detectable on a touchscreen device.

The browser 150, when in receipt of the user event, determines how the received user event is to be handled, and what screens (graphical user interfaces) should be displayed in response to the handled user event. Typically, the browser engine is configured to handle user events by invoking predefined functions that may be implemented at least in part by the device operating system, for example through the invocation of an operating system API. These functions may, however, be implemented entirely within the browser engine. An example that may be implemented on a touchscreen device is a swipe gesture, which comprises a touchdown, touchmove, and touchend event (i.e., the user touching the touchscreen surface with a finger, tool, or other appendage; moving the finger along the surface; and finally lifting the finger and breaking contact with the touchscreen). FIG. 5A illustrates the gesture as a first touch, represented by the first broken oval 510; a movement while contact is maintained in the direction indicated by the arrow 520; and finally a cessation of movement at the second location represented by the second oval 530, at which point contact may be broken (i.e., the touch ends). The user events representing this gesture may be provided to the browser application, if it is the application executing in the foreground, either as a set of multiple user events (touchdown, touchmove, touchend) or as a gesture event (a swipe in a specified direction at a specified speed and distance). One method of responding to this user event is to scroll the displayed content in the direction of the gesture. The browser engine may use the content of the webpage currently being rendered and its DOM structure to determine the appearance of the webpage when the scrolling is completed, render this appearance of the webpage for display, and push a screen comprising this rendering to the computing device 100's display stack for display to the user.

As another example, another user event that may be received via a touchscreen is a double-tap, illustrated in FIG. 5B. The double-tap comprises two touches in quick succession (touchdown, touchend, touchdown, touchend) at approximately the same location, as indicated by first and second broken ovals 540, 550. The user events representing these touches may be provided to the browser either as a set of two distinct, single touch events, or alternatively as a single touch event representing a double-tap. The browser may handle this event or these events by default by interpreting the double-tap as an instruction to zoom into or out of the page, thus magnifying or reducing the display size of the webpage's contents.

These predefined functions are thus the default actions or handling functions that are invoked by the browser when a particular user event is detected, and are typically called without reference to any event handlers or other instructions for handling user events provided for the webpage or other resource being rendered by the browser. This default behaviour of the browser or other environment may be overridden or pre-empted by custom handling instructions provided with or in the webpage 300 or other resources. For example, an event handler may be associated with target elements within the resource (which may include the entire page of the resource), such that when a user event having such an element as its target is detected, the user event is processed in accordance with the methods or scripts associated with the event handler rather than in accordance with the default action associated with that user event within the browser environment. The event handling function defined for the target element may programmatically prevent the firing of the default handling action, for example by invoking the preventDefault( )method in JavaScript. The event handler may be associated with the target element in different ways, for example through XML attributes or a script identifying the target in accordance with the resource's DOM. The event handler may be directly assigned to the target element, or to an ancestor of the target element. Thus, the foregoing swipe gesture, if it is trapped by an event handler provided for the webpage 300, may yield a completely different result when it is processed by the event handling script. For example, instead of scrolling the webpage, an image may instead be dragged to a different location or another function or pop-up screen may be invoked. Similarly, instead of responding by displaying a magnified or reduced view of the document 300, the browser may trap the double-tap or the two single tap events of FIG. 5B and pass it to the script for processing to yield a different result. A double tap, for example, may toggle a button or other input element displayed in the webpage.

Figure 6A:
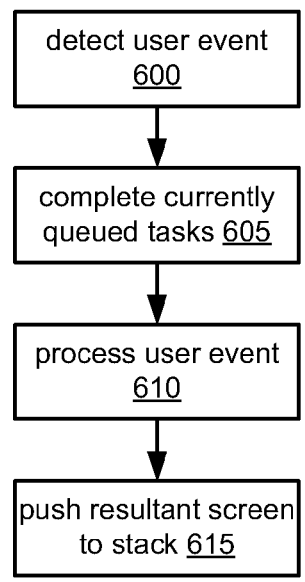
FIG. 6A is a flowchart illustrating a process for processing a received user event.

The processing of user events such as the foregoing is generally carried out by a main browser thread executing on the computing device 100. However, the main browser thread may have other tasks to be carried out, and some of these tasks may be particularly long-running. Tasks that may block the handling of user events in the main thread include, but are not limited to, rendering elements of the web page such as animated images, decoding images, parsing HTML code, constructing the DOM tree as specified by HTML/DOM/CSS standards, executing JavaScript or other code specified in the webpage or an external resource, and the like. Although the main browser thread may interleave the processing of these tasks, the existence of potentially long-running, ongoing tasks may delay the browser 150's response to the detected user event. The browser's user interface therefore appears unresponsive to the user. This is illustrated in the flowchart of FIG. 6A, which begins with detection of a user event at 600; whatever currently queued tasks that take precedence over processing the user event are completed at 605, at which point the main browser thread is able to process the received user event at 610. The result of the processing is rendered for display on the device 100, and the screen representing the rendered webpage 300 is pushed to the device's display stack at 615. The processing 610 may comprise the browser determining whether there is an event handler defined for the user event in the webpage 300 or in an associated resource (such as a separate script file), and if so, passing the user event to that event handler so that the script may be executed, and also determining if the default response (e.g. scrolling or zooming) is programmatically prevented by the script (for example, through use of preventDefault( ) in JavaScript); and if not, calling the appropriate default event handling function, which may be integral to the browser 150's engine, or may be invoked by calling an operating system procedure.

Figure 6B:
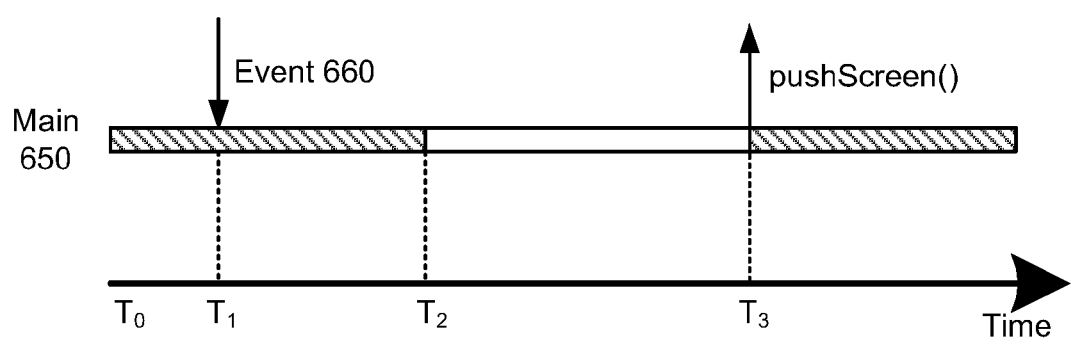
FIG. 6B is a timing diagram illustrating the processing of a received user event in accordance with the process of FIG. 6A.

Thus, there is a possible delay while the main thread waits for the opportunity to process the user event at 610. This is represented in the timing diagram of FIG. 6B, which illustrates a main browser thread 650. At time $T_1$, a user event 660 is received by the main thread; however, the main thread 600 is busy with another task and may not be able to process the user event 660 right away, resulting in a delay until time $T_2$, when the main thread 600 begins processing the user event 660. Finally, at time $T_3$ the main thread pushes a resultant screen to the display stack of the device 100. The delay between time $T_1$ and $T_2$ may in fact be brief, on the order of milliseconds. In some circumstances, the delay may be noticeable by the user.

Figure 7:
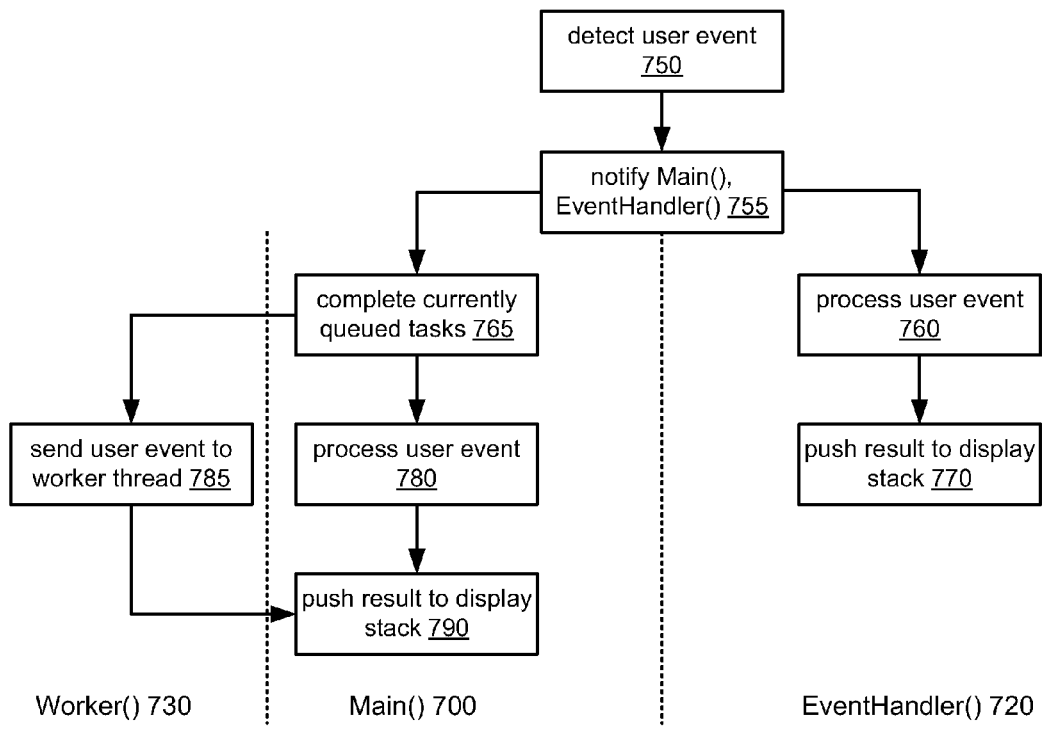
FIG. 7 is a flowchart illustrating a further process for processing a received user event.

Accordingly, a process such as that illustrated in FIG. 7 is implemented. Upon detection of a user event 750, at 755 the browser 150 both notifies the main browser thread 700 (referred to as Main) and also invokes an event handler thread 720 (here referred to as EventHandler). The notification of the user event and invocation of the event handler thread may be carried out substantially concurrently, although there may be a slight timing difference. While the main thread 700 completes any currently queued tasks 765, the secondary event handler thread 720 processes the user event using a copy of the webpage 300's appearance, for example a bitmap image cached at the device 100 reflecting a rendering of the current webpage. The device 100 caches the current state of the webpage as rendered, including its scroll position as displayed in the viewport on the display 110 (which may be the entire screen of the display or a window), and its size (e.g., its magnification factor). Based on the current state, the event handler thread 720 determines the effect of the user event on the image and pushes a rendering of the image to the display 110. Thus, for a user event corresponding to a scroll command, the image of the current webpage is scrolled an amount corresponding to the distance specified for the user event; and for a user event corresponding to a zoom in or zoom out command, the image is appropriately scaled in size. Other default actions that may be rendered in the image by the event handler thread 720 may include highlighting any user-actionable items or elements under the touch point of the user event. The event handler thread 720 may thereafter update the current state of the webpage 300 on the device 100.

Alternatively, the secondary event handler thread 720 may process the user event using a copy of the webpage document itself, rather than an image rendering, referencing the webpage's DOM structure at 760 to determine what default browser handling action should be applied. When the event handler thread 720 determines the result of the default action, it renders the webpage 300 in accordance with that user event and then pushes the result to the display stack at 770.

In the meantime, when it is available to do so the main thread 700 processes the user event using any event handler defined in the webpage or in association with the webpage 300, and using any JavaScript or other programmatic constructs provided in association with the webpage 300. The main thread 700 also references the current state of the webpage 300 cached at the device 100 in processing the user event. The webpage state may have been updated in the meantime by the event handling thread 720. Processing the user event may comprise invoking a worker thread 730 as indicated by block 785, although the main thread 700 may process the user event itself at 780. Thus, while the event handler thread 720 processes the user event as though it is intended to be processed in accordance with default browser handling processes for that user event, the main thread 700 and/or the worker thread 730 process the user event in view of any JavaScript or other scripts for the webpage 300. In some circumstances, the script processed by the main thread 700 or worker thread 730 may also result in scrolling or zooming of the webpage 300.

When the processing by the main thread 700 or the worker thread 730 is complete and a new user interface view of the webpage 300 is rendered by the main thread 700 or worker thread 730, the resultant screen is pushed to the display stack at 790. This resultant screen may be pushed to the stack after the event handling thread had pushed its screen to the stack.

In some embodiments, not every thread executing in a process or application may be able to push a screen to onto the device's display stack. Access to the display stack may be limited to only that thread or process in possession of a user interface event lock. Typically, the main thread 700 holds the user interface event lock. Thus, in some embodiments, if the secondary event handling thread 720 is ready to push its screen to the display stack first, it requests the event lock from the main thread 700 and then pushes the screen once it receives the lock. The main thread 700 may subsequently retrieve the lock from the event handling thread 720. In other embodiments, the event handling thread 720 may pass the resultant screen to the main thread 700 to push onto the display stack. In still other embodiments, each of the main thread 700 (or worker thread 730) and event handling thread 720 may determine the outcome of the user event they process, and update the current state of the webpage 300 in the device cache, but the actual rendering of the webpage 300 for display on the display 110 may be delegated to a further rendering thread (not shown).

Figure 8A:
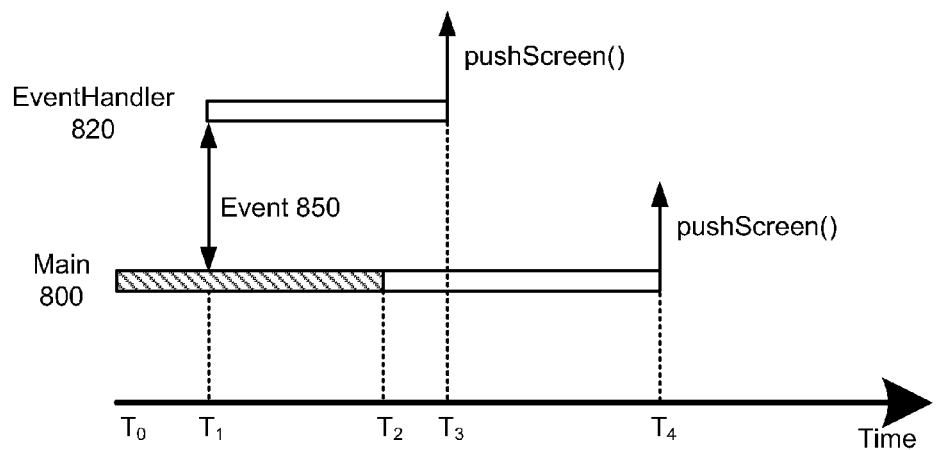
FIG. 8A is a further timing diagram illustrating the processing of a received user event in accordance with the process of FIG. 7.

This process is illustrated in the timing diagram of FIG. 8A. As can be seen in that figure, the event 850 is received at time $T_1$, and both the main thread 800 and event handler thread 820 are notified. The event handler thread 820 proceeds to process the user event 850, resulting in a resultant user interface screen for the webpage 300 being pushed to the display stack at time $T_3$. In the meantime, at time $T_2$, the main thread 800 begins processing the user event 850, which may include sending the event 850 and any relevant event handling script to a worker thread, not shown. At time $T_4$ the main thread's resultant screen is pushed onto the stack.

Figures 8B, 8C:
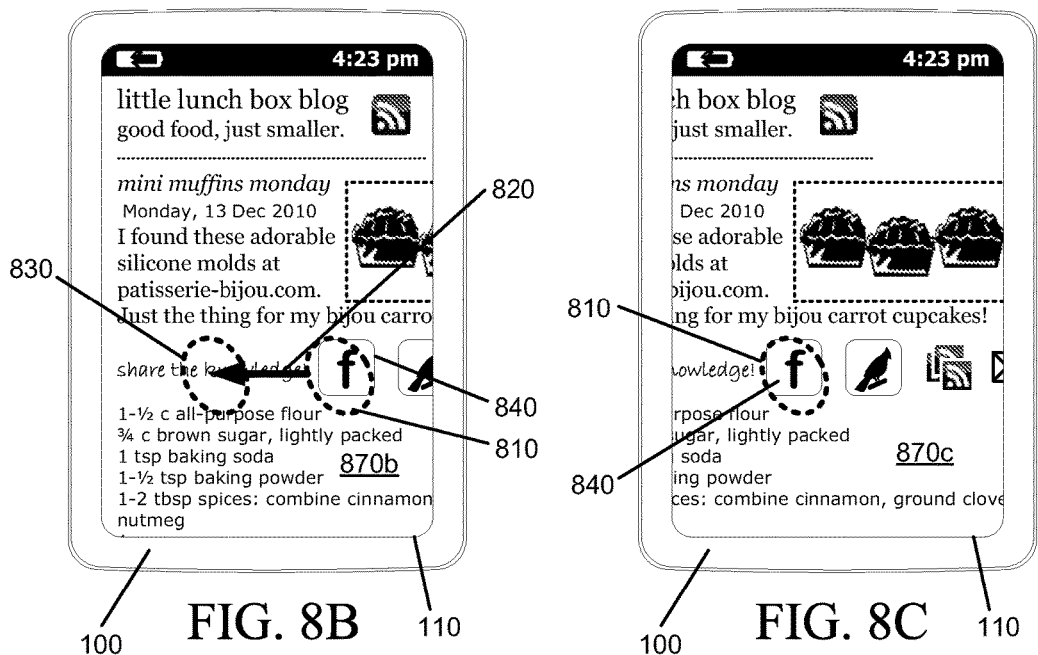
FIGS. 8B, 8C and 8D are further illustrations of screens presenting the HTML content of FIG. 3 in response to the process of FIG. 7.
Figure 8D:
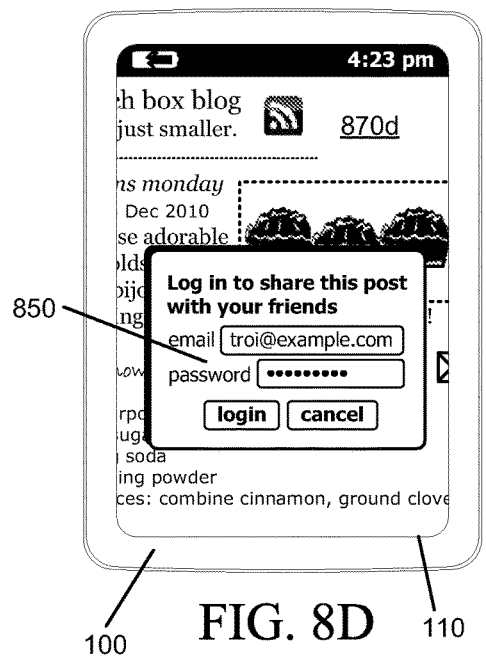

Although the display 110 of the computing device 100 is thus possibly updated twice in response to the user event, and although the user event is processed twice, it may be observed that the result of the main thread's subsequent processing of the user event will remain valid because the main thread will process the user event with reference to the element or page position that originally received the user event. Further, if the main thread 800 references the current state of the webpage 300 as it may have been updated by the event handling thread 820 when processing the user event, the main thread 800 may provide an updated screen that is consistent with the behaviour reflected by the event handling thread 820's screen. Examples of user interface screens that may be displayed through the course of the process of FIG. 8A are illustrated in FIGS. 8B, 8C and 8D. In FIG. 8B, a first screen 870b is shown on a touchscreen device 100. This screen may be the initial view of the webpage 300, shown previously in FIG. 4. In this example, a user event comprising a swipe gesture, as outlined by the initial broken oval 810, arrow 820, and second broken oval 830, will be detected at the touchscreen 110. The starting position indicated at 810 is superimposed over one of the images 840. In this example, the webpage 300 comprises code implementing an event handler when that particular image 840 receives a user event, such as a tap or touch, including a touchdown event that begins the swipe gesture.

The detected user event or events, which may comprise the touchdown, touchmove, and touchend gestures (or which alternatively may comprise a single swipe gesture event), is thus passed to both the main thread 800 and the event handler thread 820 of FIG. 8A. The event handler thread 820 begins processing the event or events in accordance with the default handling function of the browser 150. In this case, the event handler thread 820 will process the event or events as a scrolling instruction, with the result that a new user interface screen 870c will be drawn and pushed to the display stack, as illustrated in FIG. 8C. It can be seen that the screen 870c comprises the rendered webpage 300 of FIG. 8B, but the position of the webpage 300 within the viewport defined in the display 110 is shifted from its original position in FIG. 8B, reflecting the distance indicated by the touchmove event or swipe gesture event.

In the meantime, the main browser thread 800 processes the event, invoking any event handlers and scripts defined in the webpage 300 or in an accompanying script file. The processing by the main thread may take place concurrently with the processing by the event handler thread 820, or at least partially concurrently. The event received by the main thread 800 may be treated effectively like a mouse event; for example, the detected events may be converted to cursor events, so the touchdown event is interpreted as a mousedown event acting on the image 840. This event, whether it is converted to a cursor event or delivered for processing as a touch event, is processed in accordance with the script defined for the webpage 300. In this case, the script invokes a pop-up user interface. This result is rendered in a screen by the main thread 800, and is pushed to the display stack. The result is illustrated in FIG. 8D. Screen 870d comprises the same view of the webpage 300, but with an additional user interface screen 850 overlaid on the screen 870d. Further, to the user, the behaviour of the browser in displaying the overlay screen 850 will likely be expected, since the user's finger remained on the image 840 at the end of the swipe gesture, as indicated by the broken oval 810 in FIG. 8C. In this manner, a user interface responsive to the user event is rendered for display at an earliest possible juncture, thus improving the apparent responsiveness of the browser and user experience.

Figure 8E:
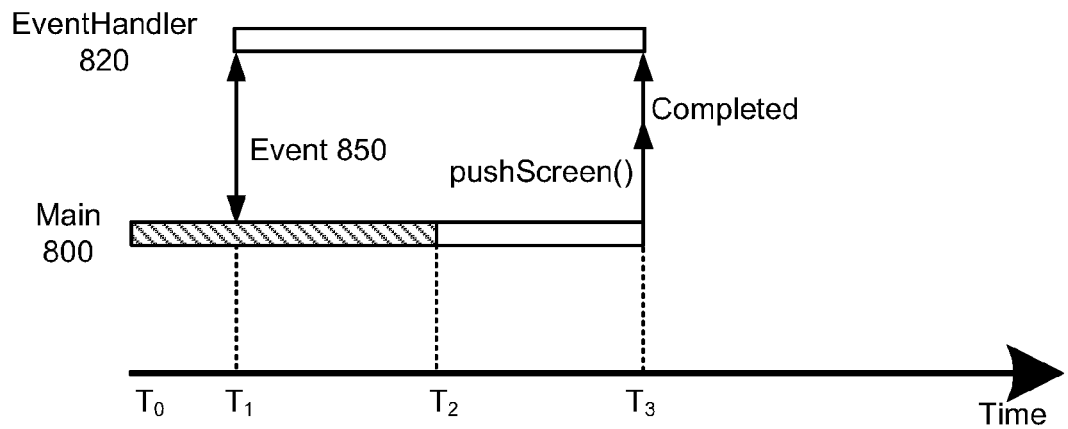
FIG. 8E is a further timing diagram also illustrating the processing of a received user event.

Typically, the event handler thread 820 is given higher priority than the main thread 800 so that the event handler thread 820 may complete its processing of the user event before the main thread 800 completes its processing. Otherwise, in some cases, despite any inherent delays in the main thread 800, the main thread may complete its processing of the user event 850 before the secondary event handler thread 820 completes its processing. This is illustrated in the timing diagram of FIG. 8E. Again, the user event is received by the main 800 and event handler 820 threads at time $T_1$. The event handler thread 820 begins processing the event at that time in accordance with the default handling functions of the browser, while the main thread 800 begins its processing at time $T_2$ using any event handlers defined for the webpage 300. In this case, however, the main thread 800 completes its processing at time $T_3$ and pushes a resultant screen to the display stack at that time. At the same time, the main thread 800 notifies the event handler thread 820 that it has completed processing. The event handler thread 820 may therefore terminate, since its processing is no longer needed.

Figure 8F:
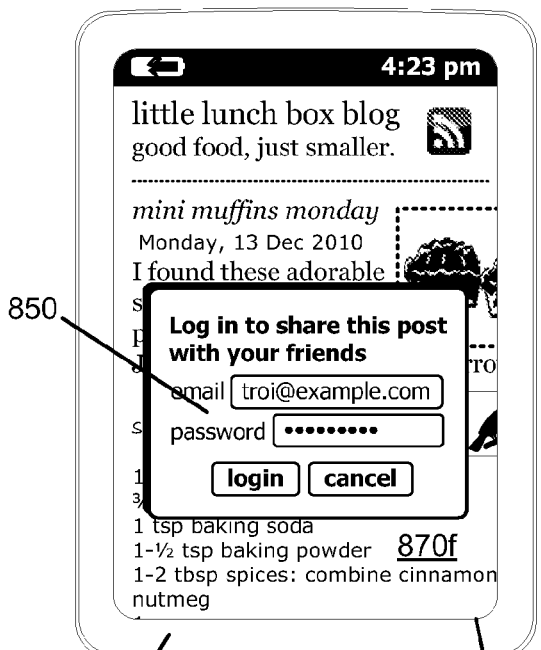
FIG. 8F is an illustration of a screen presenting the HTML content of FIG. 3 in response to the process of FIG. 8E.

In this example, the resultant screen pushed to the stack may resemble the screen 870f shown in FIG. 8F. While there is again displayed the overlay screen 850 as described above, the view of the webpage 300 is the same as that shown in FIG. 8B, i.e., not scrolled to the position of FIG. 8C or 8D, because the completion of processing by the main thread 800 pre-empted the scrolling of the screen by the secondary event handler thread 820.

Figure 9A:
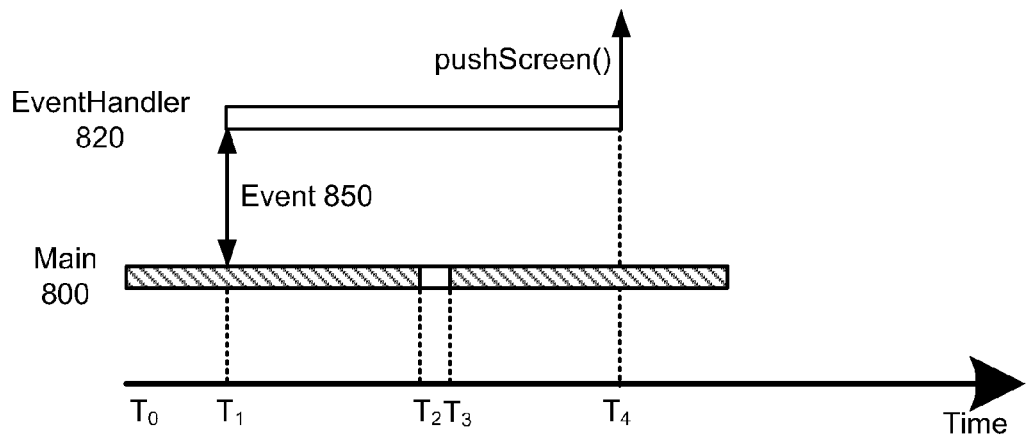
FIGS. 9A and 9B are timing diagrams illustrating other processing of a received user event.

While the secondary event handling thread 820 processes the user event 850 as though the event is intended to be handled using browser default methods and the main thread 800 process the user event 850 in accordance with any scripts provided for the webpage 300, it may be determined by the main thread that there is no other event handler available for the user event 850, and that indeed the default handling action is the one to be used to handle the user event. This is illustrated in FIG. 9A, where the event is initially received by the main 800 and event handler 820 threads at time $T_1$; at time $T_2$, the main thread 800 begins processing the user event 850, but quickly determines that the default handling method applies. The main thread 800 may therefore end this event handling task at time $T_3$, and permit the event handling thread 820 to continue to time $T_4$ where the resultant screen is pushed to the display stack by the event handling thread 820 (or, alternatively, the event handling thread 820 passes the resultant screen to the main thread 800, and the main thread 800 pushes the screen onto the stack). In this manner, the event handling thread 820 still carries on the task of processing the user event since it has already begun to do so, thus improving responsiveness of the browser user interface for the user.

Figure 9B:
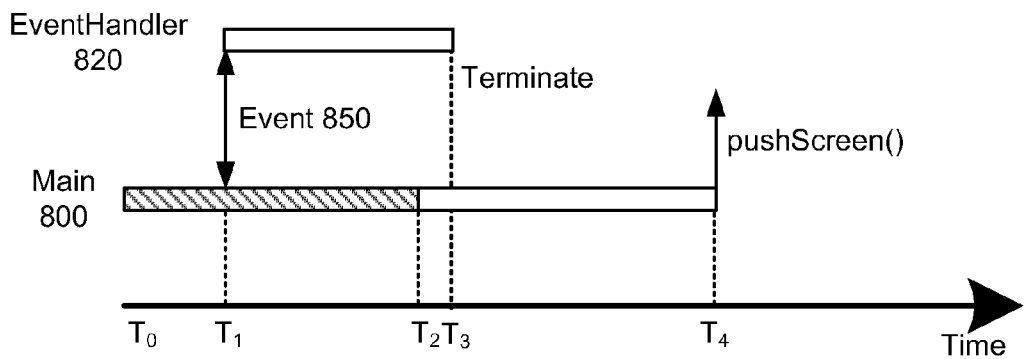

In other cases, the main thread 800 may determine when it processes the event 850 that the default handling method is programmatically pre-empted by the script provided for the webpage 300. Turning to FIG. 9B, again the event 850 is received by the two threads 800, 820 at time $T_1$. The event handling thread 820 proceeds to process the user event 850 as discussed above. In the meantime, the main thread 800 begins processing the user event at time $T_2$ in accordance with a script provided for the webpage 300, and determines that a preventDefault( )method, or an analogous method, has been called. If the event handling thread 820 has not yet completed processing of the event 850, then the main thread 800 notifies the event handling thread 820 that it should be terminated, since its processing is no longer required. Accordingly, the event handling thread 820 terminates at time $T_3$. The main thread 800 proceeds to process the event as described above, and at time $T_4$ pushes a new screen onto the display stack.

Figure 10:
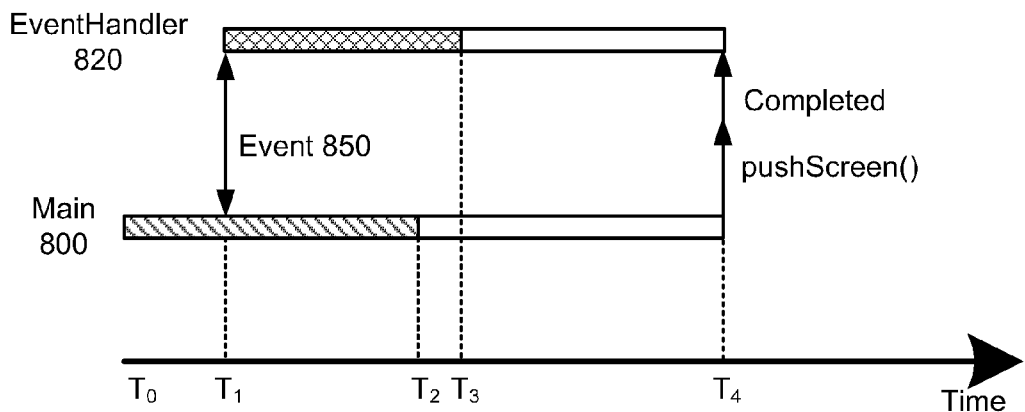
FIG. 10 is a timing diagram illustrating the processing of a received user event incorporating a delay factor.

The use of the secondary event handling thread 820 effectively operates as a contingency measure to improve responsiveness of the user interface. However, it may also be desirable to reduce the incidence of unnecessary scrolling or zooming resulting from the secondary event handling thread 820 completing its processing task before the main thread 800 completes its task. Therefore, in a variation of the above embodiments, a small delay is introduced into the event handling thread 820's task, to give the main thread 800 a head start in processing the user event 850. As shown in FIG. 10, again the event 850 is provided to both threads 800, 820 at time $T_1$. However, rather than immediately processing the event 850, the event handling thread 820 delays for a short period of time (for example, 100 ms) before commencing processing at time $T_3$. In the meantime, the main thread 800 may have commenced its own processing at time $T_2$ (although it is possible that the main thread 800 may still only begin its processing after time $T_3$). At time $T_4$, the main thread 800 completes its processing, and pushes a new screen to the display stack. The main thread 800 also notifies the event handling thread 820 that its task is complete, so the event handling thread 820 may terminate.

The foregoing embodiments thus provide a system and methods for handling user events in a cooperative fashion, where two threads 800 and 820 share user event processing tasks in order to improve the apparent reaction time of the browser user interface for the user.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits comprising custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rightsholder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method of processing user events on a plurality of threads, the method comprising:
receiving a user event at a touchscreen of an electronic device curing display of a document by the touchscreen;
dispatching the user event to a main thread of a web browser and to a secondary thread of the web browser, wherein the main thread of the web browser is configured to process user events and non-user events;
after a predetermined period of time has elapsed following the start of processing of the user event by the main thread or dispatch of the user event to the main thread, processing the user event by the secondary thread, wherein the secondary thread is configured to process the user event using a default handling method;

upon completing processing of the user event by the main thread, updating the display of the document according to the processing completed by the main thread; and notifying the second thread to terminate by the main thread, in response to the completion of the processing.

2. The method of claim 1, wherein the main thread is configured to process queued tasks such that processing of the user event by the main thread may be delayed until processing of other previously queued tasks completes.

3. The method of claim 1, wherein the predetermined period of time is at least 100 milliseconds.

4. The method of claim 1, wherein the default handling method is defined at the electronic device prior to receipt of the document.

5. The method of claim 1, wherein the document comprises a webpage.

6. The method of claim 5, wherein the webpage specifies a handling method for the user event and wherein the main thread processes the user event according to the specified handling method.

7. The method of claim 6, wherein the handling method specified by the webpage is different than the default handling method.

8. The method of claim 6, wherein the handling method specified by the webpage is the same as the default handling method.

9. An electronic device comprising:
a touchscreen;
at least one processor in communication with the touchscreen, the at least one processor being configured to:
receive a user event at the touchscreen of the electronic device during display of a document by the touchscreen;
dispatch the user event to a main thread of a web browser and to a secondary thread of the web browser, wherein the main thread of the web browser configured to process user events and non-user events;
after a predetermined period of time has elapsed following the start of processing of the user event by the main thread or dispatch of the user event for to the main thread of the web browser, process the user event by the secondary thread, wherein the secondary thread is configured to process the user event using a default handling method;

upon completing processing of the user event by the main thread, update the display of the document according to the processing completed by the main thread; and notify the second thread to terminate by the main thread, in response to the completion of the processing.

10. The electronic device of claim 9, wherein the main thread is configured to process queued tasks such that processing of the user event by the main thread may be delayed until processing of other previously queued tasks completes.

11. The electronic device of claim 9, wherein the predetermined period of time is at least 100 milliseconds.

12. The electronic device of claim 9, wherein the default handling method is defined at the electronic device prior to receipt of the document.

13. The electronic device of claim 9, wherein the document comprises a webpage.

14. The electronic device of claim 13, wherein the webpage specifies a handling method for the user event and wherein the main thread processes the user event according to the specified handling method.

15. The electronic device of claim 14, wherein the handling method specified by the webpage is different than the default handling method.

16. A non-transitory computer readable storage medium comprising processor-executable instructions which, when executed, configure a processor to:
receive a user event at a touchscreen of an electronic device during display of a document by the touchscreen;
dispatch the user event to a main thread of a web browser and to a secondary thread of the web browser, wherein the main thread of the web browser configured to process user events and non-user events;
after a predetermined period of time has elapsed following the start of processing of the user event by the main thread or dispatch of the user event to the main thread of the web browser, process the user event by the secondary thread, wherein the secondary thread is configured to process the user event using a default handling method;
upon completing processing of the user event by the main thread, update the display of the document according to the processing completed by the main thread; and
notify the second thread to terminate by the main thread, in response to the completion of the processing.

* * * * *